INVENTOR.
MARK MANDEL
BY Robert T Dunn
AGENT

Nov. 1, 1960 M. MANDEL 2,958,772

AUTOMATIC GAIN CONTROL CIRCUIT

Filed Jan. 13, 1959 2 Sheets-Sheet 2

INVENTOR.
MARK MANDEL
BY Robert T Dunn
AGENT

United States Patent Office 2,958,772

Patented Nov. 1, 1960

2,958,772

AUTOMATIC GAIN CONTROL CIRCUIT

Mark Mandel, Bloomfield, N.J., assignor to International Telephone and Telegraph Corporation, Nutley, N.J., a corporation of Maryland Filed Jan. 13, 1959, Ser. No. 786,650

11 Claims. (Cl. 250—20)

Figures 1, 3:
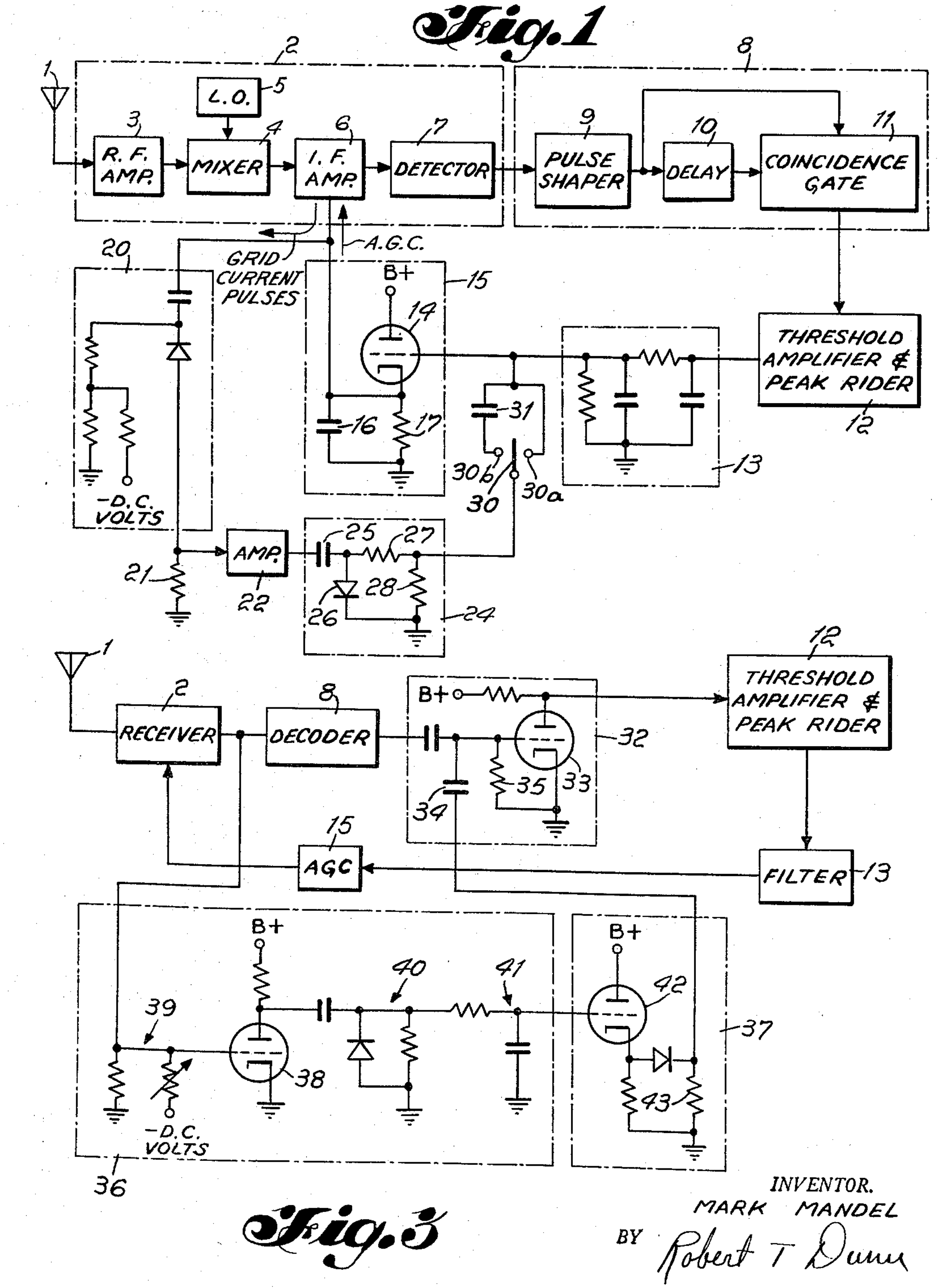

This invention relates to automatic gain control circuits and receivers utilizing the same, and more particularly to an AGC circuit in a receiver for coded signals, said signals being decoded at the output of the receiver and used to control the gain of certain stages of the receiver.

In the past, radio receivers having automatic gain control have been employed wherein the gain control is derived from the output of a special detector or decoder coupled to the receiver. One such receiver, decoder and AGC circuit is employed in the Tacan airborne equipment and described on page 62 of volume 33, March 1956, of "Electrical Communication," the technical journal of the International Telephone and Telegraph Corporation and associate companies. In such prior systems, for example, in the Tacan airborne receiver, the peak amplitude of the decoded signal is transformed into an equivalent D.C. level which is applied to the grid of a cathode follower tube serving to control the conduction of said tube, the voltage at the cathode of said tube being applied to IF stages of the receiver serving to bias these IF stages and control their gain. In normal operation a temporary increase over the steady state nominal level of the positive decoded signal is transformed into an increase in the negative D.C. level which is applied to the grid of the cathode follower which in turn biases the IF stages of the receiver to a more negative value, reducing the IF gain, thus, reducing the magnitude of the signal output from the decoder. However, under certain conditions a strong RF signal applied to the receiver will not yield a strong output signal from the decoder. This occurs when, for example, spurious signals are applied to the receiver which are blocked by the decoder or when suddenly very strong Tacan beacon signals are applied to the receiver. In either case there results a sudden overload in the IF stages of the receiver so that the output from the receiver is considerably distorted and will not pass through the decoder. Consequently, no strong signal will be applied to the grid of the AGC cathode follower as in normal operation and the IF stages of the receiver will continue to be biased at a level corresponding to maximum IF gain resulting in a stable overload condition with the output from the receiver having no effect on gain control as it is continually blocked by the decoder.

In the Tacan system described in the above-mentioned reference, all information is transmitted in the form of amplitude modulated pulse pairs with various spacings between the pulse pairs to characterize different ones of the essential signals. The pulse pairs are identical insofar as each consists of two pulses separated by twelve microseconds. The decoder coupled to the output of the Tacan airborne receiver serves to detect these pulse pairs yielding a single pulse representative of each pulse pair. The amplitude of the single pulse is equivalent to the amplitude of the pulses in each pulse pair. This decoder is immune to pulse spacings other than twelve microseconds, and thus, is immune to most noise and other signals not in the form of distinct pulses separated by twelve microseconds. This Tacan decoder is also immune to pulse signals which, although separated by twelve microseconds, are not resolved from one another within a certain predetermined degree. Consequently, a great variety of signals at the proper radio frequency can cause the IF stages of the Tacan receiver to overload and remain in a stable overloaded condition because Tacan decoder blocks said signals from controlling the AGC cathode follower.

In some cases one of several possible decoding delays are coupled to the output of the Tacan receiver to detect pulse pairs having spacings other than 12 microseconds between pulses in a pair. In such cases the differently spaced pulse pairs may originate from different sources at the same radio frequency or from the same source and may contain information other than bearing and range. However, the output corresponding to only one of the code spacings will serve to control the AGC circuit and thus, control the gain of the receiver. While this control may be proper for pulse pairs of one separation which are decoded by the decoder controlling the AGC, it will probably not be proper for pulse pairs at another separation. Consequently, the IF stages may be driven to overload by the pulses which are not decoded and not applied to the AGC circuit.

It is an object of this invention to provide an improved AGC system for use with receivers having decoders or certain types of detectors.

It is another object to provide an improved AGC system for use with the Tacan airborne receiver and decoder.

It is another object to provide means for detecting a condition of overload in a receiver and to employ said detector means to remedy said condition of overload.

It is another object to provide reduced interaction of two signals of the same radio frequency but of different code spacings in decoding receiving equipment having automatic gain control responsive to signals of one code spacing.

It is a feature of this invention to provide a device for controlling IF gain of a receiver having its output coupled to special decoding means including means coupled to the output of the decoder for producing an IF gain control signal, means coupled to said receiver for generating a signal indicative of received signals of excessive amplitude and means for applying said generated signal to said means for producing an IF gain control signal.

It is a feature of one embodiment of this invention to generate said signal indicative of received signals of excessive amplitude by detecting voltage fluctuations at the grid of IF stages of a receiver which occur when said grids draw currents due to an overload condition and to convert said voltage fluctuations to an equivalent D.C. signal, then to apply said D.C. signal to the AGC circuit coupled to said IF stages to thereby decrease the voltage at said grids to remedy the overload condition.

It is a feature of another embodiment to generate said signal indicative of received signals of excessive amplitude by coupling threshold detecting means to the output of said receiver for detecting signals of excessive amplitude and producing a D.C. level indicative thereof and to provide means under control of said D.C. level for applying received signals to the gain control of said receiver.

Figure 2:
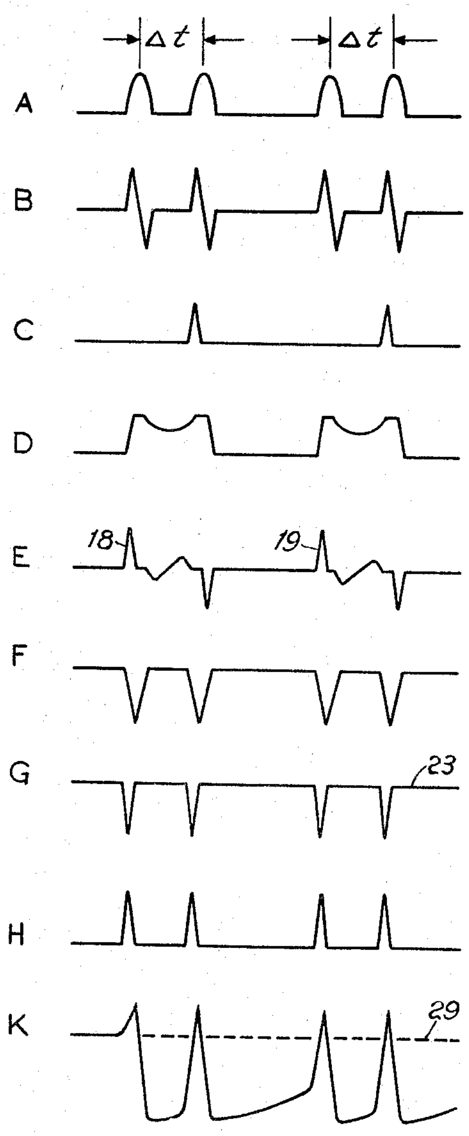

Other and further features and objects of this invention will be more apparent from the following specific description of an embodiment of this invention taken in conjunction with the drawings in which:

Fig. 1 shows a block diagram and schematic of a receiver, decoder and improved AGC circuit; and Fig. 2 depicts waveforms from which to better understand the operation of the system shown in Fig. 1; and Fig. 3 shows a block diagram and schematic of a receiver feeding at least one decoder with an improved AGC circuit coupled thereto.

Turning first to Fig. 1, there is shown an antenna 1 feeding a receiver 2 which may, for example, consist of an RF amplifier 3 feeding a mixer 4 with a local oscillator 5 also feeding said mixer producing an IF frequency which is amplified in stages of IF amplifier 6 and then fed to detector 7. The output of detector 7, consisting of pulses, such as, for example, shown in waveform A of Fig. 2 is fed to decoder 8. Decoder 8 might consist of pulse shaper 9 which serves to differentiate the output from detector 7 producing a signal such as shown in waveform B of Fig. 2. This output from shaper 9 is applied to coincidence gate 11 which responds only to positive pulses and this output is also applied to delay line 10 which serves to delay said output by the interval $\Delta t$, or in the case of one form of Tacan, twelve microseconds. When there is coincidence between the pulse from shaper 9 and a delayed pulse from delay 10 at coincidence gate 11, the gate produces an output pulse of equivalent amplitude to the pulse from shaper 9. Consequently, the output from decoder 8 is as shown in waveform C of Fig. 2. This output is fed to amplifier and peak rider circuit 12, whose output is coupled to low pass filter 13. The output from low pass filter 13 will be a D.C. signal having an amplitude representative of the maximum amplitude of pulses from decoder 8. Upon applying this D.C. signal to the grid of cathode follower tube 14 of AGC circuit 15, the cathode of tube 14 will swing towards negative and the stages of IF amplifier 6 will be biased more negative to decrease the amplitude of pulses from detector 7. A threshold, adjustable by the bias applied to threshold amplifier and peak rider 12, will determine the nominal value of the peak voltage at the detector output. The time constant of AGC circuit 15 is established principally by the component values of filter 13. This time constant is preferably long so as not to interfere with the information content of trains of pulse pairs.

When a strong RF signal is detected by antenna 1, amplified by RF amplifier 3, mixed and applied to the grid of the first stage of IF amplifier 6, the IF stages will be driven to overload. Thus, the output of detector 7 will be as shown by waveform D of Fig. 2 rather than waveform A of Fig. 2, and when waveform D is differentiated by pulse shaper 9, a signal such as shown by waveform E is produced and fed to delay line 10 and coincidence gate 11. Since the positive pulses in waveform E, denoted 18 and 19, are not each followed by a sufficiently positive pulse at an interval of $\Delta t$, little or no output is produced from decoder 8 and the output of AGC circuit 15 will swing more positive and aggravate the overload condition in stages of IF amplifier 6, thus producing a stable overload condition. To remedy this, auxiliary gain control circuit including a grid current detecting circuit 20 is coupled to the grids of stages of IF amplifier 6 and serves to detect transient variations in the level of the D.C. grid voltage due to the flow of grid current associated with received signals of excessive amplitude. When overloaded, the IF amplifier stages draw grid current each time an information signal pulse, such as shown in waveform A, or other signal of sufficient amplitude, is impressed on their grids. Waveform F of Fig. 2 depicts the fluctuations in the grid bias voltage to these stages in response to information signals such as shown in waveform A. When these fluctuations occur, the output from grid current detecting circuit 20 is impressed upon input resistor 21 of amplifier 22, generates a signal input to amplifier 22 depicted by waveform G on Fig. 2. Amplifier 22 is such that it operates at negative voltage level 23 of waveform G producing an output signal such as described by waveform H. This output, H, from amplifier 22 is applied to clamping circuit 24 which consists of capacitance 25, diode 26 and resistors 27 and 28. Circuit 24 has a relatively short time constant to increasing voltage fluctuations in the output from amplifier 22 and a relatively long time constant to decreasing voltage fluctuations in the output from said amplifier. Consequently, the output from circuit 24 taken across resistor 28 is a negative D.C. signal level such as shown by waveform K of Fig. 2, having only very brief excursions above ground level 29 also shown in waveform K. This output from circuit 24 may be applied directly to the grid of cathode follower tube 14, when switch 30 is positioned at terminal 30*a*, thereby causing the voltage level output from that tube which biases stages of IF amplifier 6 to decrease so as to remedy the overload condition.

In the case where an interfering signal is present causing a continuing overload in the IF stages of receiver 2, a corresponding continuing D.C. voltage will be produced at the output of circuit 24. To prevent this continuing condition a capacitive coupling 31 is provided for coupling circuit 24 to the grid of cathode follower 14 when switch 30 is positioned at terminal 30*b*.

Turning next to Fig. 3, there is shown another method for controlling gain in stages of IF amplifier 6 to prevent overload of these stages. As shown in Fig. 3, antenna 1 detects RF signals and applies them to receiver 2, the output of receiver 2 being decoded by decoder 8. Decoder 8 feeds pulses to threshold amplifier 32 which consists of tube 33 having its grid voltage level controlled by the charge on capacitor 34. This capacitor 34 is preferably large so that acting in conjunction with biasing resistor 35 in threshold amplifier 32, it has a time constant at least as long as the time constant of AGC circuit 15. Consequently, when charged, capacitor 34 increases the voltage on the grid of amplifier 32 whose output then increases for a given signal level from decoder 8. The output from threshold amplifier 32 is applied to amplifier and peak rider circuit 12 producing a D.C. level signal which is filtered by filter 13 and applied to AGC circuit 15. When the voltage on the grid of amplifier 32 is increased as described, IF stages of receiver 2 will be biased back further than if only the output from decoder 8 had been present. Consequently, an increased output level from receiver 2 will cause the output level from AGC circuit 15 to be more negative and in the extreme, sufficient to bias the IF back to a very low gain condition thus avoiding any pulse distortion caused by IF overload.

In order to charge condenser 34 when pulse signals applied to receiver 2 from antenna 1 are excessively large, circuit 36 and cathode follower 37 are provided. The purpose of circuit 36 is to generate a D.C. signal representative of the amplitude of detected pulses in the output of receiver 2. For this purpose the detected output of receiver 2 is applied to the control grid of tube 38, this grid being biased below cut off by a negative D.C. voltage source via biasing voltage divider 39. The negative D.C. bias is such that tube 38 conducts only when pulses of at least a predetermined amplitude appear at the output of receiver 2. Consequently, the A.C. output of tube 38 comprises of a negative pulse each time the tube conducts, each negative pulse representing an output pulse from receiver 2 of at least a predetermined amplitude. These negative pulses are applied to clamping circuit 40 which clamps the bottom end of the negative pulses to ground, thereby creating a positive D.C. signal having brief excursions to ground during the intervals of said negative pulses. This positive D.C. signal from clamping circuit 40 is then filtered by filter circuit 41 removing the brief negative excursions to produce a relatively steady D.C. signal output. The D.C. signal output from filter 41 is applied to the grid of cathode follower tube 42 whose cathode is diode coupled to resistor 43, the potential across resistor 43 serving to charge capacitor 34.

In operation, when output pulses from receiver 2 exceed a predetermined level, tube 38 conducts and through the action of circuits 40 and 41, a D.C. signal is applied to the grid of cathode follower tube 42 causing increased plate current to flow therein, resulting in an increase in voltage across resistor 43 and this voltage increase, increases the charge on capacitor 34. When the charge on capacitor 34 is increased, the voltage level of the grid of amplifier 32 in response to the output from decoder 8 decreases, and the signal level AGC circuit 15 causes IF output to decrease.

Obviously, other types of decoders or special detectors could be employed in conjunction with a receiver resulting in the same sort of overload condition in amplifier stages of the IF amplifier of the receiver resulting in voltage dips in the AGC line to the IF amplifier which are indicative of the presence of the overload condition. It is also evident that the system shown in Fig. 1 and described hereinabove for detecting those voltage dips in the AGC bus and converting them into an equivalent D.C. voltage level serving to oppose the AGC control voltage could be employed in other systems having different types of decoders or detectors between receiver and AGC circuit without deviating from the spirit or scope of the invention hereinabove described.

It is also obvious that other variable threshold and detecting means could be employed in the system shown in Fig. 3 without deviating from the spirit or scope of this invention as set forth in the accompanying claims.

I claim:

1. A system for selectively receiving coded pulse signal groups comprising signal receiving means including an intermediate frequency amplifier stage and a final detector stage; pulse decoding means coupled to said detector stage of said receiving means for detecting specially coded pulse groups each said group comprising a given number of pulses at predetermined relative spacings, said pulse decoding means including pulse shaping means for distinguishing said received pulses; gain control means connected between said decoding and receiving means for controlling the gain of said receiving means in accordance with the output of said decoding means; auxiliary gain control means coupled to said receiving means for generating auxiliary control signals in response to received signals of excessive amplitude; and means connected between said auxiliary gain control means and said gain control means for transferring said auxiliary control signals to said gain control means, thereby preventing overloading of said receiver.

2. A system according to claim 1 wherein said auxiliary gain control means is coupled to said intermediate frequency amplifier stage of said receiving means.

3. A system according to claim 1 where said auxiliary gain control means is coupled to said detector stage of said receiving means.

4. A system for selectively receiving coded pulse signal groups comprising signal receiving means including an intermediate frequency amplifier stage and a final detector stage; pulse decoding means coupled to said detector stage of said receiving means for detecting specially coded pulse groups, each said group comprising a given number of pulses at predetermined relative spacings, said pulse decoding means including pulse shaping means for distinguishing said received pulses; gain control means connected between said decoding means and said receiving means for controlling the gain of said receiving means in accordance with the output of said decoding means; detecting means coupled to said receiving means for detecting received signals of excessive amplitude; means coupled to said detecting means for generating auxiliary control signals in response to said detected signals; and means connected between said generating means and said gain control means for variably transferring said auxiliary control signals to said gain control means, thereby preventing momentary overloading of said receiving means.

5. A system according to claim 4 wherein said detecting means is coupled to said intermediate frequency amplifier stage of said receiving means.

6. A system according to claim 4 wherein said detecting means is coupled to said detector stage of said receiving means.

7. A system according to claim 5 wherein said generating means includes means for amplifying the output of said detecting means.

8. A system according to claim 6, wherein said generating means includes means for amplifying the output of said detecting means.

9. A system according to claim 4, wherein said means for variably transferring includes a coupling capacitor.

10. A system for selectively receiving coded pulse signal groups comprising signal receiving means including an intermediate frequency amplifier stage and a final detector stage; pulse decoding means coupled to said detector stage of said receiving means for detecting specially coded pulse groups, each said group comprising a given number of pulses at predetermined relative spacings, said pulse decoding means including pulse shaping means for distinguishing said received pulses; gain control means connected between said decoding means and said receiving means for controlling the gain of said receiving means in accordance with the output of said decoding means, said gain control means including means for generating a D.C. signal having an amplitude directly related to the average rate of occurrence and average amplitude of said specially coded pulse groups; detecting means coupled to said receiving means for detecting received signals of excessive amplitude, means coupled to said detecting means for generating auxiliary control signals in response to said detected signals; and means connected between said auxiliary control signal generating means and said gain control means for variably transferring said auxiliary control signal to said gain control means, thereby preventing momentary overloading of said receiving means.

11. A system for selectively receiving coded pulse signal groups comprising signal receiving means including an intermediate frequency amplifier stage and a final detector stage; pulse decoding means coupled to said detector stage of said receiving means for detecting specially coded pulse groups, each said group comprising a given number of pulses at pre-determined relative spacings, said pulse decoding means including pulse shaping means for distinguishing said received pulses; a first transfer circuit coupled to said decoding means for transferring signals representative of said detected pulse groups; gain control means coupled between said first transfer circuit and said receiving means for controlling the gain of said receiving means in accordance with said transferred signals; detecting means coupled to said final detector stage of said receiving means for detecting received signals of excessive amplitude; a second transfer circuit coupled to said detecting means for transferring auxiliary control signals in response to said detected signals of excessive amplitude; and means connected between said second transfer circuit and said gain control means for variably transferring said auxiliary control signals to said gain control means, thereby preventing momentary overloading of said receiving means.

References Cited in the file of this patent

UNITED STATES PATENTS

| | | |
|---|---|---|
| 2,538,028 | Mozley | Jan. 16, 1951 |
| 2,651,033 | Frantz | Sept. 1, 1953 |
| 2,756,327 | Keizer | July 24, 1956 |
| 2,853,601 | McKenna et al. | Sept. 23, 1958 |
| 2,857,594 | Frank et al. | Oct. 21, 1958 |

OTHER REFERENCES

Scarborough: "Tacan Ground Beacon AN/URN-3," Electrical Communication, March 1956, page 29.